(12) United States Patent
Schneider et al.

(10) Patent No.: US 10,712,551 B2
(45) Date of Patent: Jul. 14, 2020

(54) APPARATUS AND METHOD FOR CLEANING A LENS

(71) Applicant: Schneider GmbH & Co. KG, Fronhausen (DE)

(72) Inventors: Gunter Schneider, Marburg (DE); Jürgen Krall, Ober-Ramstadt (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 0 days.

(21) Appl. No.: 15/687,679

(22) Filed: Aug. 28, 2017

(65) Prior Publication Data

US 2018/0059411 A1    Mar. 1, 2018

(30) Foreign Application Priority Data

Aug. 29, 2016 (DE) .................. 10 2016 010 334
Oct. 14, 2016 (DE) .................. 10 2016 012 253

(51) Int. Cl.
| | |
|---|---|
| G02B 27/00 | (2006.01) |
| G02C 13/00 | (2006.01) |
| B08B 1/00 | (2006.01) |
| B08B 1/02 | (2006.01) |
| B08B 1/04 | (2006.01) |
| B08B 3/02 | (2006.01) |
| B08B 11/00 | (2006.01) |
| C03C 23/00 | (2006.01) |

(52) U.S. Cl.
CPC .......... *G02B 27/0006* (2013.01); *B08B 1/002* (2013.01); *B08B 1/02* (2013.01); *B08B 1/04* (2013.01); *B08B 3/022* (2013.01); *B08B 11/00* (2013.01); *C03C 23/0075* (2013.01); *G02C 13/006* (2013.01)

(58) Field of Classification Search
CPC ......... B08B 1/002; B08B 3/041; B08B 3/044; B08B 11/02; B08B 11/04; G02C 13/006; G02C 13/008; B29D 11/00865
USPC ........................................................... 134/61
See application file for complete search history.

(56) References Cited

U.S. PATENT DOCUMENTS

| | | | | |
|---|---|---|---|---|
| 3,464,080 | A | * 9/1969 | Certo | G02C 13/006 15/302 |
| 4,569,695 | A | 2/1986 | Yamashita et al. | |
| 5,317,778 | A | 6/1994 | Kudo et al. | |
| 5,372,651 | A | 12/1994 | Kodama | |
| 5,996,596 | A | * 12/1999 | Smith | A61L 12/026 134/135 |
| 6,001,191 | A | * 12/1999 | Kamikawa | B08B 3/04 134/2 |
| 2005/0254148 | A1 | * 11/2005 | Shimizu | B05C 13/02 359/819 |

(Continued)

FOREIGN PATENT DOCUMENTS

| | | |
|---|---|---|
| DE | 103 53 553 A1 | 6/2005 |
| DE | 10 2004 026 523 A1 | 12/2005 |

(Continued)

*Primary Examiner* — Mikhail Kornakov
*Assistant Examiner* — Natasha N Campbell
(74) *Attorney, Agent, or Firm* — David S. Safran; Roberts Calderon Safran & Cole, P.C.

(57) ABSTRACT

An apparatus and a method for cleaning a lens with which the lens can selectively be fed by means of a common handling device to several cleaning devices and can be moved in a lens-specific manner during cleaning.

23 Claims, 5 Drawing Sheets

(56) References Cited

U.S. PATENT DOCUMENTS

| | | | |
|---|---|---|---|
| 2006/0032521 A1* | 2/2006 | Gehrig | B08B 11/02 |
| | | | 134/71 |
| 2006/0157089 A1* | 7/2006 | Taylor | G02C 13/006 |
| | | | 134/52 |
| 2009/0026640 A1* | 1/2009 | Weymouth, Jr. | ............ |
| | | | B29D 11/00067 |
| | | | 264/2.6 |
| 2009/0038645 A1* | 2/2009 | Nomura | B08B 3/04 |
| | | | 134/18 |

FOREIGN PATENT DOCUMENTS

| | | |
|---|---|---|
| DE | 20 2006 014 557 U1 | 10/2007 |
| EP | 0 215 261 A2 | 3/1987 |
| EP | 1 707 278 A1 | 10/2006 |

\* cited by examiner

APPARATUS AND METHOD FOR CLEANING A LENS

BACKGROUND OF THE INVENTION

Field of the Invention

The present invention pertains to an apparatus for cleaning a lens, wherein said device has several cleaning devices, and in particular, a common handling device for feeding the lens, or a carrier with the lens, to the cleaning devices. The invention further pertains to a method for cleaning a lens by means of a device with at least one cleaning device.

Description of Related Art

German Patent Application DE 103 53 553 A1 discloses a system and a method for blocking off glasses lenses, i.e., lenses for eyeglasses, wherein the lenses are continuously run and/or conveyed one after the other by means of a band-like conveyor device through several cleaning devices after being detached from a block piece. The cleaning devices have separate containers and processing chambers. Cleaning can be performed by means of brushing, spraying, and dipping of the lenses. The lenses are preferably clamped on grid-like carriers. This system is relatively large and does not allow optimum cleaning, in particular with a wide variety of lenses.

SUMMARY OF THE INVENTION

The object of the present invention is to provide an apparatus and a method for cleaning a lens, wherein a simple and compact design and/or optimized cleaning is/are made possible.

The above-mentioned object is achieved by an apparatus and by a method as described herein.

One aspect of the present invention lies in the fact that, in particular, a common handling device is provided for several or all cleaning devices, as well as an optional coating device, the coating device preferably having a gripping device for gripping the lens or the carrier with the lens and for holding it into the respective cleaning device for cleaning and/or into the optional coating device for coating. This makes a simplified design possible since no continuous and continuously conveying conveyor device is required. In addition, this is conducive to a compact design. Moreover, this approach allows optimized cleaning since the time for cleaning the lenses in the respective cleaning devices can be individually adapted and/or can be varied individually.

Another aspect of the present invention lies in the fact that the apparatus and/or handling device is preferably designed for feeding the carrier or the carrier with the lens selectively to one of the cleaning devices. This is in particular conducive to optimized cleaning since, depending on the lens or lenses in each case, it is possible to set an adapted and/or optimum cleaning time for cleaning in the individual cleaning devices.

According to another aspect of the present invention, the apparatus and/or handling device is preferably designed for individually moving, delivering, forwarding or feeding the lens or the carrier with the lens to one or each of the cleaning devices. This in turn is conducive to optimized, individually adapted cleaning of the respective lens.

According to another aspect of the present invention, the cleaning devices can preferably be operated or fed independently of one another in each case. This makes individual and tailored cleaning of the lenses possible and allows in particular a compact and/or modular and preferably easily adaptable design of the cleaning apparatus. In particular, continuous conveying of the lenses and/or conveying of the lenses that runs through all cleaning devices is/are thus avoided.

In particular, an apparatus and a method for cleaning and optionally coating a lens are proposed, wherein the lens is selectively fed by means of a common handling device to several cleaning devices and is positioned and/or moved in a lens-specific manner during cleaning.

Particularly preferably, the lens or a pair of lenses is moved transversely to the feeding direction in an oscillating or gyrating manner in the cleaning device during a cleaning step. This promotes optimized cleaning.

Particularly preferably in the cleaning device, the lens or a pair of lenses is individually delivered for cleaning, depending on a lens parameter such as the lens thickness, to a cleaning unit of the respective cleaning device. This in turn promotes optimized and tailored cleaning of the respective lens.

Particularly preferably, the lens is fed from above and/or in the vertical direction, in particular selectively to one of several cleaning devices and/or the coating device. This allows a compact design and/or optimized cleaning/coating.

Preferably, the apparatus and/or handling device is CNC controlled (Computer Numerical Control) and/or is designed for, in particular, position-controlled positioning of the lens or the carrier with the lens in the respective cleaning device and/or coating device. This promotes optimized and/or defined cleaning and/or coating.

According to the proposal, the term "cleaning" is in particular defined to mean cleaning by mechanical treatment with a cleaning unit, such as a brush, cleaning by subjecting to fluid, for example by spraying, rinsing or dipping, and/or cleaning by means of exposure to a stream of gas or air, for example by means of a blower and/or for drying.

Cleaning of the lenses is necessary in particular for subsequent coating and/or surface treatment and/or finishing of the lenses. In particular, the lenses must be cleaned for coating and/or surface treatment and/or must have a high degree of cleanliness, so that the coating will adhere to the lens surface and/or to ensure that no particles are trapped between the lens surface and the coating.

The apparatus preferably has, in particular, in addition to the cleaning device, at least one coating device for coating and/or surface treatment of the lens, preferably wherein the cleaning device and the coating device are arranged in a common housing, in particular next to one another. In this way, the lenses can be cleaned and coated and/or surface-treated in a single device. This is conducive to a compact design.

It is particularly preferred to have a common handling device or separate handling devices for the cleaning device and the coating device.

Individual of the above-mentioned and subsequent aspects and features of the present invention can be combined in any way desired, but they can also be implemented independently of one another.

Additional aspects, features, advantages, and properties of the present invention will become clear from the following description of preferred embodiments with reference to the accompanying drawings.

DETAILED DESCRIPTION OF THE INVENTION

In the figures, the same reference numbers are used to refer to the same components and parts, even if no repeated description is given.

Figure 1:
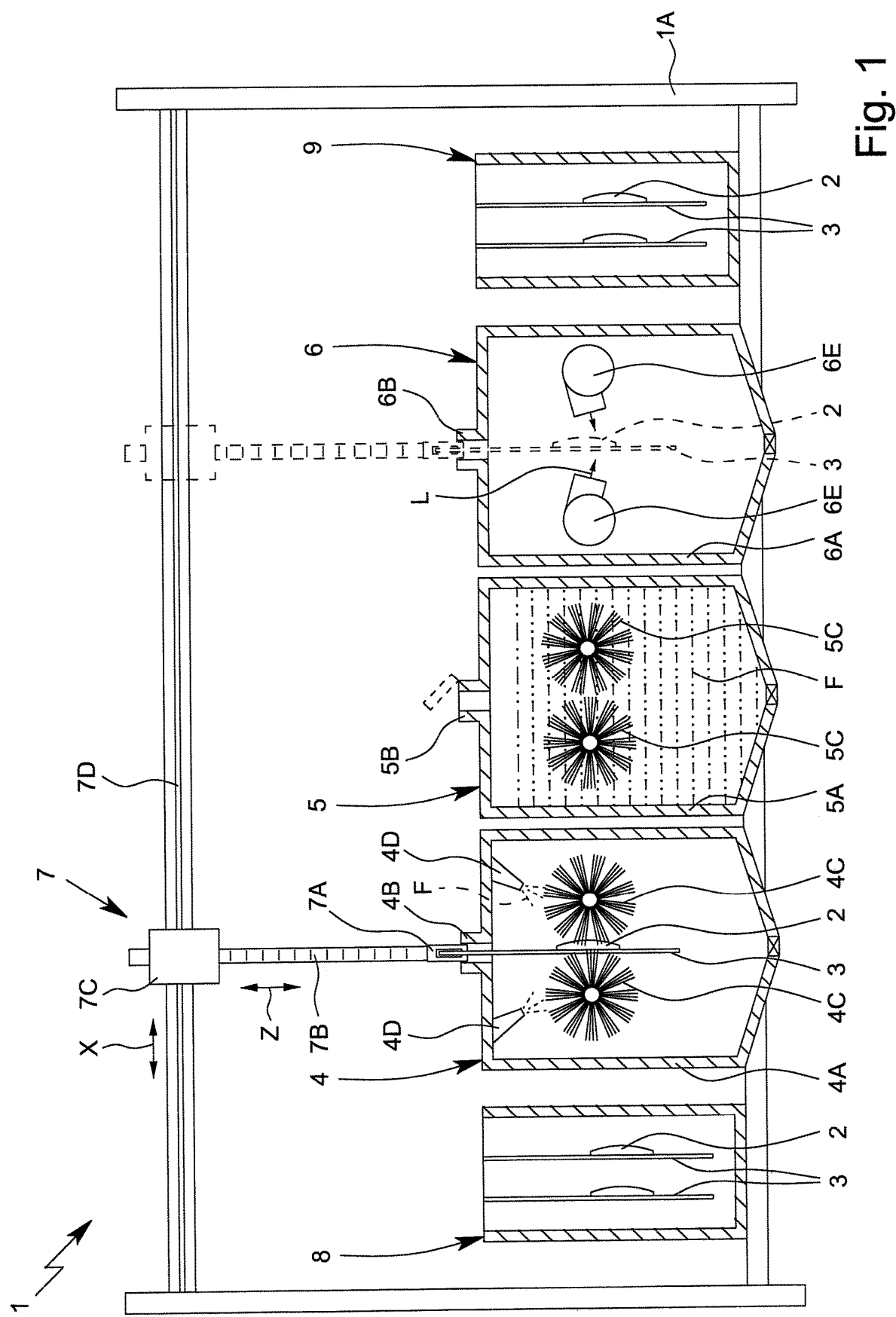
FIG. 1 shows a schematic sectional front view of an apparatus in accordance with a first embodiment of the invention.

FIG. 1 is a schematic front view of an apparatus 1 in accordance with the invention for cleaning at least one lens 2. The apparatus 1 is preferably designed in such a way that several lenses 2 can be cleaned in succession or at the same time.

Particularly preferably, the lens 2 is a so-called eyeglass glass, i.e., a lens for a pair of eyeglasses. Accordingly, the lenses 2 are preferably cleaned in pairs. It is also possible for several lens pairs to be cleaned at the same time.

Hereinafter, reference will be made in most cases only to the lens 2 even if the apparatus 1 simultaneously cleans or can simultaneously clean several lenses 2, in particular a pair of lenses or several lens pairs.

The lens 2 is preferably made of plastic, but it can also optionally be made of glass or a similar material.

The lens 2 preferably has a diameter of several centimeters, in particular of more than 3 centimeters.

Figure 2:
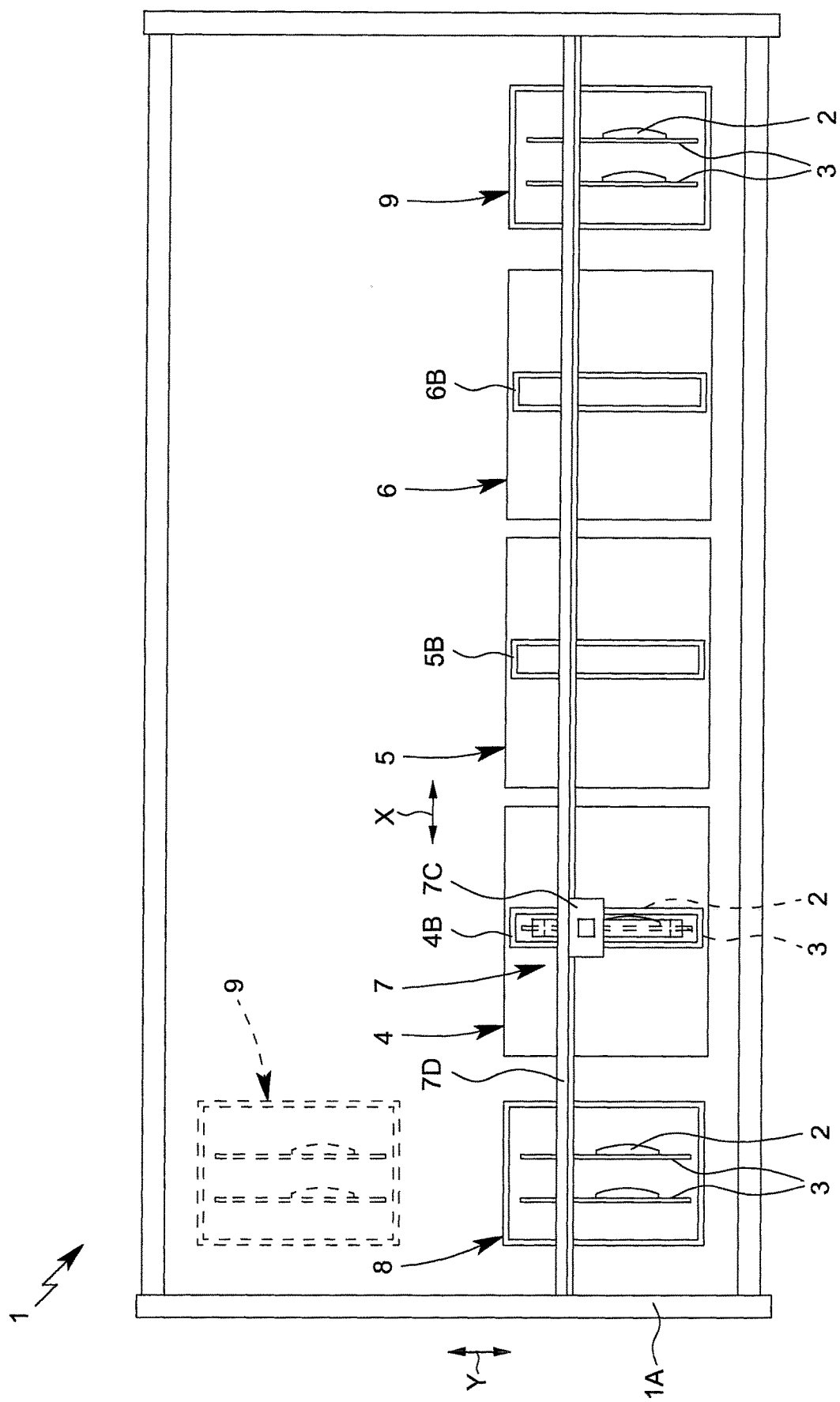
FIG. 2 is a top view of the apparatus according to FIG. 1.

FIG. 2 shows the apparatus 1 in accordance with the invention in a schematic top view.

Figure 3:
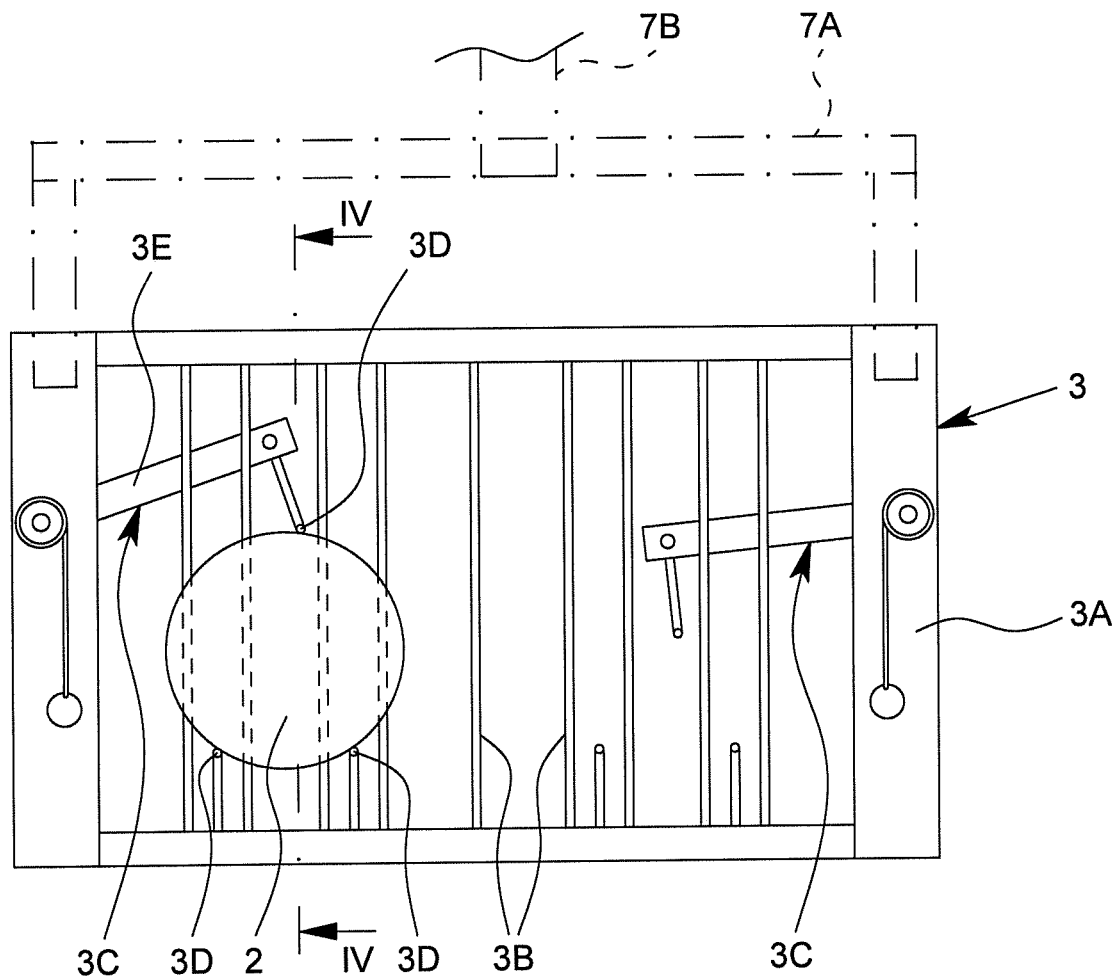
FIG. 3 is a schematic view of a carrier with a lens in accordance with a first embodiment.

FIG. 3 is a schematic view of a carrier 3 holding a lens 2. Preferably, the lens 2 that is to be cleaned is held by the apparatus 1 directly or via a carrier 3 during cleaning.

The carrier 3 is in particular designed like a lattice or grate.

The carrier 3 preferably has a frame 3A, carrier rods 3B, and/or a holding device 3C or several holding devices 3C, here, for example, two holding devices 3C.

The carrier 3 is in particular designed for supporting and/or mounting (in particular via the carrier rods 3B) and/or for clamping a lens 2 or several lenses 2, particularly preferably a pair of lenses 2 for a pair of eyeglasses, as shown in the illustrative example. In principle, however, the carrier 3 can also be designed for holding more than two lenses 2 or several pairs of lenses 2.

The holding device 3C is preferably designed for clamping an assigned lens 2, as indicated on the left side in FIG. 3.

The lens 2 is preferably clamped and/or held on its periphery and/or edge. For this purpose, the holding device 3C in particular has corresponding (in this case three) holding sections 3D that can be attached to the periphery and/or edge of the lens 2, as illustrated by the section according to FIG. 4 along section line IV-IV of FIG. 3. In particular, the holding sections 3D extend transversely or vertically with respect to the carrier plane and/or lens plane.

In the illustrative example, preferably a holding section 3D of one and/or each holding device 3C can be or is prestressed via a spring arm 3E against the two other fixed holding sections 3D in order to clamp the lens 2 between them. However, other design approaches are also possible.

As indicated in FIGS. 1 & 2, the apparatus 1 preferably has several cleaning devices, in the illustrative example three cleaning devices 4, 5, and 6. These devices serve in particular for differentiated cleaning and/or preferably have different cleaning units and/or different configurations of cleaning units. In principle, however, it is also possible for cleaning devices to serve for the same cleaning or to be structured and/or designed alike and/or to be equipped with same cleaning units.

The apparatus 1 preferably has a handling device 7 for supplying the lens 2 and/or the carrier 3 with the lens 2 to the cleaning devices 4, 5, 6. In particular, a common and/or just a single handling device 7 is provided.

The handling device 7 is designed in particular only for supplying in each case a single one of the cleaning devices 4, 5, 6 with the respective lens (lenses) 2 that is (are) to be cleaned.

In particular, the apparatus 1 and/or handling device 7 is designed for supplying the lens 2 or the carrier 3 with the lens 2 selectively to one of the cleaning devices 4, 5, 6.

In particular, the cleaning devices 4, 5, 6 can thus be supplied independently of one another with one or several lenses 2 and/or can be operated independently of one another.

Preferably, some or all of the cleaning devices 4, 5, 6 are arranged next to one another or one behind the other in a row and/or arrangement direction, here in the horizontal direction X, as indicated in FIG. 1.

The apparatus 1 and/or the handling device 7 are preferably designed in such a way that the lens 2 and/or the carrier 3 with the lens 2 can be fed/is fed transversely to the arrangement direction X.

In particular, the apparatus 1 and/or the handling device 7 are designed in such a way that the lens 2 or the carrier 3 with the lens 2 can be fed/is fed to the cleaning devices 4, 5, 6 selectively and/or from above and/or in the vertical direction Z.

In addition, the apparatus 1 and/or the handling device 7 is preferably selected in such a way that the lens 2 and/or the carrier 3 with the lens 2 can be moved in the arrangement direction X, so that they can individually approach and/or feed the cleaning devices 4, 5, 6 one after the other and/or in any order.

According to a further aspect, which can also be realized independently, the apparatus 1 and/or handling device 7 is preferably designed in such a way that the lens 2 and/or the carrier 3 with the lens 2 can also be moved transversely and/or perpendicularly with respect to the feed direction Z and in particular also transversely and/or perpendicularly with respect to the arrangement direction and/or direction of motion X in a transverse direction Y, as indicated in schematic form in the top view according to FIG. 2.

The X direction and the Y direction preferably run horizontally and/or perpendicularly with respect to the feed direction Z.

The handling device 7 preferably has a gripping device 7A in order to grip the lens 2 or in particular the carrier 3 with the lens 2 and preferably to hold the lens 2 or the carrier 3 with the lens 2 into the respective cleaning device 4, 5, 6 for cleaning.

The gripping device 7A is preferably driven, controlled, and/or actuated electrically, hydraulically, or pneumatically.

In particular, the handling device 7 and/or gripping device 7A engages with the frame 3A of the carrier 3, as schematically indicated in FIG. 3.

The handling device 7 preferably has an arm 7B that carries the gripping device 7A and/or runs or can be moved or shifted in the Z direction, as shown in FIG. 1.

The handling device 7 preferably has a drive and/or slide 7C for the arm 7B in order to allow the desired movement to be executed, in particular in the Z direction.

The handling device 7 preferably has a rail 7D, which extends in the X direction and/or the arrangement direction of the cleaning devices 4, 5, 6 and/or holds and/or guides the gripping device 7A and/or the arm 7B and/or the slide 7C in particular in such a manner that the gripping device 7A, arm 7B or slide 7C can be moved or shifted by a motor.

In the illustrative example, the gripping device 7A, the arm 7B, the slide 7C, and/or the rail 7D can preferably be moved and/or shifted in addition in the transverse direction Y as well, in particular by means of appropriately guiding and/or mounting the rail 7D on a rack 1A of the apparatus 1. Other design approaches are also possible, however.

The corresponding motions and/or displacements or shifts are done or effected in particular by means of a motor or several motors, particularly preferably by means of an electric, hydraulic, and/or pneumatic drive, and/or they are controlled, particularly preferably closed-loop controlled or feed-back-controlled, and/or by means of servo drives.

Particularly preferably, controlled positioning, in particular of the lens 2 and/or the carrier 3 with the lens 2, is done relative to or inside of one or several or all cleaning devices 4, 5, 6, by means of the handling device 7.

Position controlling and/or positioning is performed, in particular, on a lens-specific basis and/or in a way that is specific to the respective cleaning device 4, 5, 6.

By way of example, the handling device 7 is stand-alone power system (SPS) controlled or CNC-controlled.

The cleaning devices 4, 5, 6 preferably each have a separate and/or closed-off or secluded processing chamber and/or their own housing 4A, 5A, and 6A, as indicated in FIG. 1.

The processing chambers and/or housings 4A, 5A, and 6A are preferably closed off to a large extent and/or are preferably open only toward the top.

Particularly preferably, the cleaning devices 4, 5, 6 each form closed and/or closed-off or secluded processing chambers for the respective fluids F, unlike conventional pass-through cleaning devices.

The cleaning devices 4, 5, 6 each preferably have a separate port 4B, 5B, and 6B for receiving the respective lens 2 that is to be cleaned and/or the carrier 3 with the lens 2.

Preferably, the port 4B, 5B, 6B is designed slit-shaped and/or collar-like, in particular with an upward-projecting collar or side-wall section, as indicated in FIG. 1.

The handling device 7 and/or its arm 7B and/or gripping device 7A and/or a component arranged in-between or thereon is preferably designed in such a way that, when the lens 2 and/or carrier 3 is run into the respective cleaning device 4, 5, 6, the opening of the respective port 4B, 5B, 6B is closed and/or covered as much as possible.

Alternatively or additionally, the port 4B, 5B, 6B can also have a closure element such as a cover (indicated by dotted lines and in schematic form in FIG. 1 in the case of the second cleaning device 5 and its port 5B) in order to close the respective cleaning device 5, for example when it is not in use and/or when the handling device 7 is run in (in a better way or in addition).

Particularly preferably, both a feeding-in of the lens 2 into the respective cleaning device 4, 5, 6 and a removal of the lens 2 are accomplished via the same opening and/or port 4B, 5B, 6B. To move the lens 2 into and out of a cleaning device 4, 5, 6, the lens 2 is preferably moved back and forth in only a single vertical plane and/or linearly. This allows the apparatus 1 to have an especially compact structure, in particular with an especially small footprint.

The one cleaning device or all of the cleaning devices 4, 5, 6 and/or their housings 4A, 5A, 6A preferably have an opening or a drain to make it easier to clean the respective cleaning device 4, 5, 6. For example, the cover can be removable and/or the bottom can be equipped with a corresponding drain or can be designed in the shape of, for example, a funnel, as schematically indicated in FIG. 1.

In the illustrative example, the cleaning device 4 is designed for in particular mechanical cleaning of the lens 2, and/or the first cleaning device 4 preferably has one or several brushes 4C and/or nozzles 4D as cleaning units.

The brushes 4C can preferably be rotated and/or are designed at least essentially in the shape of a cylinder.

The brushes 4C are preferably spaced apart and/or are arranged with parallel axes of rotation in such a way that the lens 2 can be positioned, in particular together with the carrier 3, between the two brushes 4C for cleaning.

The brushes 4C can selectively be operated with the same or opposite directions of rotation; when they are operated with an opposite direction of rotation, they are preferably operated in such a way that the brushes 4C slide off of at the lens 2 in the downward direction.

The brushes 4C are preferably driven by motor, in particular electrically, hydraulically, or pneumatically.

The rotational speed of the brushes 4C can be controlled or feedback-controlled.

The rotational speed of the brushes 4C can be adapted in a varied fashion depending on the desired type of cleaning or else in a lens-specific manner as required.

The axes of rotation of the brushes 4C run especially horizontally and/or transversely, particularly preferably perpendicularly, with respect to the arrangement direction X and/or feed direction Z.

The brushes 4C and/or their axes of rotation can be spaced apart in such a way and/or the bristles can be of such a length that the bristles of the two brushes 4C mesh together between the two axes of rotation if there is no lens 2 between them.

If necessary, the distance between the axes of rotation and/or the brushes 4C and/or the bristles thereof can also vary or be adjusted, for example by virtue of the fact that a brush 4C can be shifted relative to the other brush 4C in a direction that is transverse to the axis of rotation, in particular in the horizontal direction and/or the arrangement direction X. In this way, it is also possible to ensure lens-specific adaptation and cleaning.

The brushes 4C extend preferably in the axial direction and/or the Y direction in such a way that one or several lenses 2 can be cleaned simultaneously. In the illustrative example, the carrier 2 can carry and/or hold, in particular, two lenses 2 that are then positioned and/or held between the brushes 4C in a way that they are spaced apart or shifted in the horizontal direction and/or axial direction and/or Y direction for cleaning.

If necessary, the distance between the axes of rotation and/or the distances between the bristles of the two brushes 4C and/or the lengths of the bristles of the brushes 4C can vary in the axial direction in order, for example depending on the axial position of the lens 2, to achieve a differentiated cleaning behavior at the brushes 4C. Thus, by means of the axial positioning and/or positioning in the Y direction of the lens 2, it is possible to achieve a desired type of cleaning and/or a type of cleaning that can be varied individually and/or is specific to the lens.

The nozzles 4D have the function in particular of supplying liquid F, in particular a cleaning liquid, water, or the like.

The nozzles 4D can direct or dispense the liquid F onto the cleaning units and/or brushes 4C and/or directly onto the lens 2 to be cleaned, depending on the design and/or desired type of cleaning.

In the first cleaning device 4, the liquid F is preferably sprayed or injected in. However, any other type of feed is also possible in principle.

In the second cleaning device 5, the lens 2, not shown here, is, for example, dipped. Accordingly, the liquid F is poured, at least partially, into the cleaning device 5 and/or its housing 5A and/or the processing chamber that is formed or bounded thereby. Correspondingly, a dipping bath is formed, which also forms a possible cleaning unit in terms of the present invention the present invention.

In the illustrative example, the second cleaning device 5 preferably also has one or several brushes 5C, in particular two brushes 5C. As in the case of the first cleaning device 4, said brushes can also be designed in such a way that the comments regarding the brushes 4C also apply accordingly to the brushes 5C.

In the illustrative example, the third cleaning device 6 is preferably designed for drying the lens 2 and/or the third cleaning device 6 preferably has an air or gas feed and/or a blower 6E as a cleaning unit, as schematically indicated in FIG. 1. In particular, a stream of air L is directed from one or two sides onto the lens 2 that is damp and/or is to be cleaned, in particular in such a way that the stream of air L in each case strikes the lens 2 obliquely downward. In this way, for example, residual liquid or other impurities can be blown away or removed and/or the lens 2 can be dried, which also constitutes a preferred cleaning in terms of the present invention.

The cleaning devices 4, 5, 6 are preferably designed modularly and/or can be operated independently of one another. Accordingly, the apparatus 1 can very easily be adapted and/or converted to meet different requirements.

If necessary, similar or equal modules, i.e., similar or equal cleaning devices 4, 5, or 6, can be provided in order to achieve, for example, a desired throughput and/or a desired degree of selection security.

Preferably, the individual cleaning devices 4, 5, 6 can be used and/or employed to clean the lens 2—thus, in particular in a lens-specific manner—as needed and in any order and/or for different lengths of time. It is specifically this capability that is not afforded with the continuous and serial passage through several cleaning devices that is common in the state of the art.

According to a particularly preferred aspect of the present invention that can also be implemented independently, the lens 2 or, for example, a pair of lenses 2 is moved within the cleaning device 4, 5, 6 during cleaning. This can be done transversely to the feed direction Z and preferably also transversely to the arrangement direction X, in particular in the Y direction.

In particular, movement in the Y-Z plane and/or between the spaced-apart or parallel brushes 4C or 5C can also take place, for example, in an oscillating or gyrating manner.

Alternatively, or additionally, movement in the X direction can also be provided or superimposed.

Moreover, in principle, optimized and/or individual, i.e., lens-specific, feeding of the lens 2 to one or more cleaning units in the respective cleaning device 4, 5, 6, i.e., for example, desired or adapted feeding to a brush 4C, 5C, etc., is also possible. This can be done based on, for example, the lens size or lens thickness and/or because of other parameters.

According to the proposed solution, in particular in contrast to the conventional continuous conveying through several cleaning devices, it is therefore possible now to ensure individual and/or lens-specific cleaning of the individual lenses 2 or a group of lenses 2, for example a pair of lenses 2, in particular by varying or adapting the cleaning time, the positioning and feeding, and/or movement during cleaning.

In terms of the present invention, "individual" and/or "lens-specific" cleaning is defined in particular to mean that the cleaning in the respective cleaning device 4, 5, 6 can be optimized or adapted independently of the cleaning in another cleaning device 4, 5, 6 for the respective lens 2 or group of lenses 2 and/or independently of the cleaning of other lenses. This can be accomplished very easily and, in particular, is provided with the apparatus 1 in according to the proposal and with the method in according to the proposal.

This gives rise, in particular, to different parameters and movement options for the individual and/or optimum adaptation of the movement of the lens 2 relative to one or several cleaning units during cleaning. For example, a linear or non-linear motion and/or oscillating motion can be selected. Moreover, the speed and/or movement frequency and/or oscillation frequency can be adapted or varied. In addition, preferably all three directions in space X, Y, Z can be combined and used in any desired way in order to position and/or move the lens 2 relative to the respective cleaning units during cleaning.

Preferably, an individual common handling device 7 is provided for all cleaning devices 4, 5, 6 of the apparatus 1.

In particular, the handling device 7 holds and/or positions the lens(es) 2 to be cleaned in each case during cleaning as well, i.e., at every cleaning step and/or in every cleaning device 4, 5, 6.

In principle, however, it is also possible that the handling device 7 loads a cleaning device 4, 5, 6 with a lens 2 and/or a carrier 3 and feeds and/or deposits, during cleaning in this cleaning device 4, 5, 6, another lens 2 and/or another carrier 3 to or in, respectively, another cleaning device 4, 5, 6. This can be provided for, e.g., specified individual cleaning devices 4, 5, 6 in which the lens 2 is not moved during cleaning. For this purpose, for example, the carrier 3 can in particular be mounted on the housing 4A, 5A, 6A of the respective cleaning device 4, 5, 6 or accommodated and/or held in some other way, in particular in a defined way.

Alternatively or additionally, optionally several handling devices 7, in particular two handling devices 7, can also be used, as is explained in greater detail below using the example of FIG. 5. It can make sense to do so in particular in the case of more than two, three, or four cleaning devices 4, 5, 6 and/or when the apparatus 1 is equipped with additional devices, in order to ensure good utilization of the cleaning devices 4, 5, 6 and thus good utilization and/or good throughput of the apparatus 1.

The apparatus 1 preferably has a device for intermediate storage of lenses 2 that are to be cleaned and/or one or several carriers 3 with lenses 2 that are to be cleaned and/or for cleaned lenses 2 and/or one or several carriers 3 with cleaned lenses 2.

The device for intermediate storage can comprise in particular a magazine 8 and/or two or more magazines 8, 9, as indicated in FIG. 1 by way of example.

For example, the magazine 8 can be designed for receiving and/or holding or preparation of several carriers 3 with lenses 2 that are to be cleaned and/or have been cleaned.

Preferably, the magazine 8 can be designed as a module or case and/or in a form that is open at the top, so that the carriers 3 are accessible to the handling device 7.

It is possible for the apparatus 1 and/or handling device 7 to remove from the magazine 8, the carriers 3 with lenses 2 to be cleaned, one after another, and after cleaning, to deposit the items back into the same magazine 8 or to feed the items to the other, optional magazine 9.

In the illustrative example, the magazine 8 with the lenses 2 to be cleaned is arranged on, for example, one side of the apparatus 1 and/or the rack 1A and the magazine 9 with cleaned lenses 2 on another and/or opposite side of the apparatus 1 and/or rack 1A.

However, for example, the second magazine 9 and/or the magazine 9 with the already cleaned lenses 2 can also be arranged, on the same side as the first magazine 8 and/or next to the magazine 8 with the lenses 2 that are to be cleaned, as indicated by the dashed lines by way of example in FIG. 2. Here, the magazine 9 is shifted in the Y direction and/or transverse direction relative to the magazine 8. However, the magazine 9 can also be, for example, arranged in line with and/or in the arrangement direction X or as an extension of the cleaning devices 4, 5, 6 beside the first magazine 8.

If the apparatus 1 and/or handling device 7 deposits the cleaned lenses 2 back into the same magazine 8, 9 as that from which the lens 2 was previously removed, the apparatus 1 can also, however, work with two or more magazines 8, 9. Once a magazine 8 has been worked through, work can begin on the next magazine 9. In this way, as continuous an operation of the apparatus 1 as possible and/or as high a throughput as possible can also be achieved.

The magazine 8, 9 can be fed, withdrawn, and/or changed preferably manually or in an automated manner.

The apparatus 1 and/or its rack 1A preferably has a common housing (not shown) or forms such a housing that encompasses the essential components, in particular the cleaning devices 4, 5, 6 or other devices, the handling device 7, and optionally also the magazine 8 and/or magazines 8, 9. The magazine 8, 9 can then preferably be fed, withdrawn, and/or changed via a corresponding port, opening, door, etc., not shown. Other design approaches are also possible, however.

The device for intermediate storage of lenses 2 and/or carriers 3 with lenses 2 can also comprise, instead of a magazine 8 or several magazines 8, 9, only a loading area, etc., by way of example.

The loading area is then preferably provided inside of the housing and/or inside of the working area of the handling device 7.

Below, another particularly preferred embodiment of the apparatus 1 will be explained in greater detail with reference to FIGS. 5 to 7.

The apparatus 1 in accordance with the second embodiment is preferably designed basically like the apparatus 1 described with reference to FIGS. 1 to 4. In particular, the apparatus 1 described below has one, several, or all features of the previously-described apparatus 1, so that the previous comments apply accordingly.

In a schematic front view, FIG. 1 shows the apparatus 1 as proposed in accordance with the second embodiment.

According to the embodiment presented in FIG. 1, the apparatus 1 is preferably designed both for cleaning and for (subsequent) coating of at least one lens 2.

Preferably, the apparatus 1 has—in particular in addition to the cleaning devices 4, 5, and 6—at least one coating device 10, preferably wherein the coating device 10 is designed for coating, in particular for hard-coating, and/or for surface treatment and/or finishing of the lens 2.

In terms of the present invention, the term "coating" is preferably defined to mean surface treatment and/or finishing of the lens 2 by depositing thin layers onto the lens surface in particular in order to alter and/or influence properties of the lenses, such as transmission, reflection, absorption, mechanical strength, heat resistance, and/or chemical resistance. For example, a lens can be hardened and/or mirror-coated or anti-glare-coated or provided with a filter by an appropriate coating.

The coating device 10 and the cleaning devices 4, 5, 6 are preferably arranged in a common housing of the apparatus 1—in particular next to one another.

Figure 5:
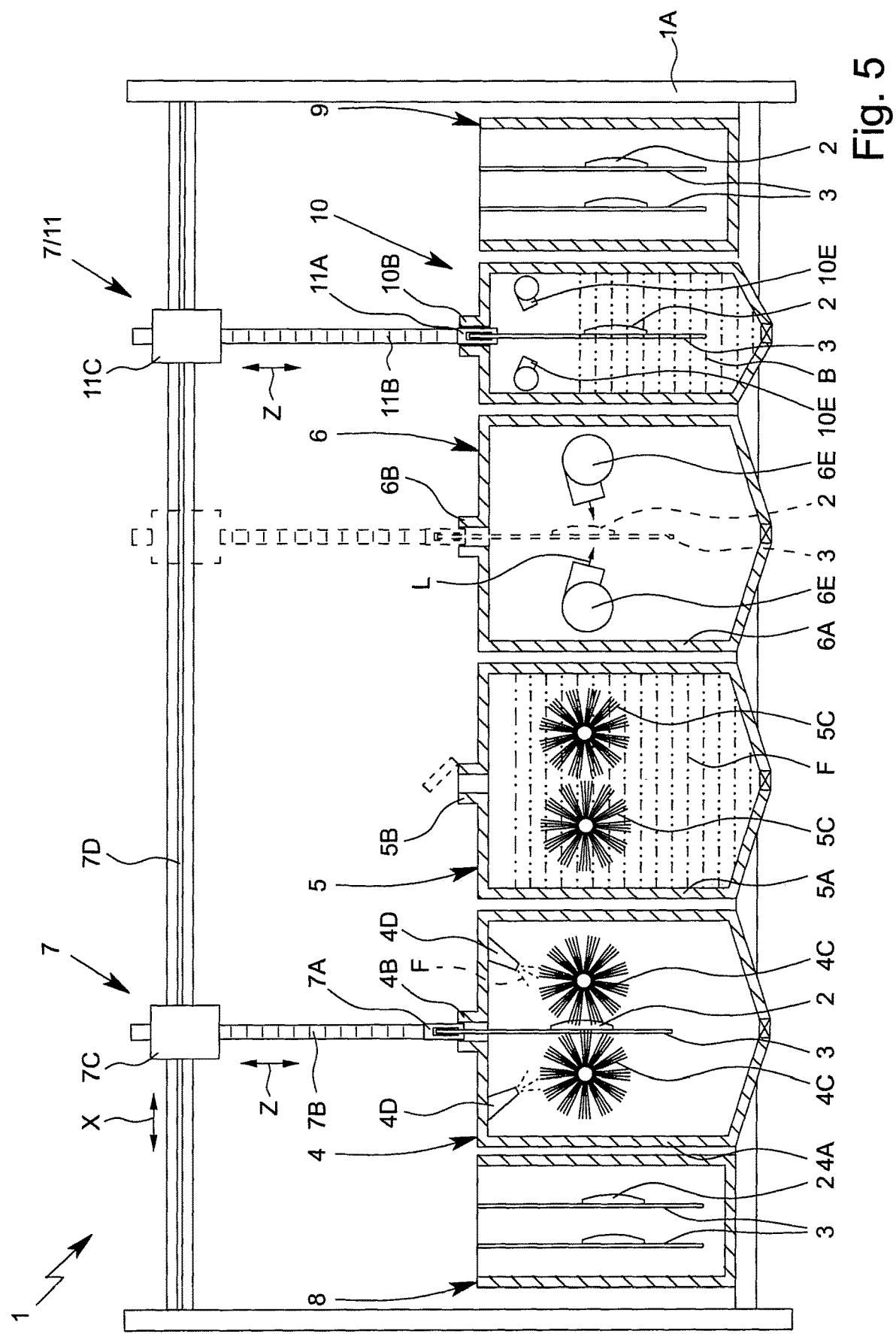
FIG. 5 is a schematic partial sectional front view of an apparatus in accordance with a second embodiment of the invention.

The coating device 10 preferably has its own and/or a closed-off or secluded processing chamber and/or reaction chamber and/or a separate housing 10A and/or a separate port 10B to receive the lens 2 that is to be coated and that has preferably already been cleaned and/or the carrier 3 with the lens 2 that has been cleaned and/or is to be coated, as indicated in FIG. 5.

In the embodiment shown, the coating device 10 is preferably designed as a dipping bath and/or is designed to coat that the lens 2 in the dipping method.

Particularly preferably, the coating device 10, in particular the housing 10A and/or the processing chamber, is or can be at least partially filled with a coating agent B, in particular such that the lens 2 can be dipped into the coating agent B for coating. Here, however, other design solutions and/or method variants are also possible, in particular those in which the coating and/or the coating agent B can be created and/or applied by chemical or physical vapor deposition, in particular by evaporation deposition. In particular, the coating agent B can be present or can be applied in liquid, gaseous, or vapor form.

In the embodiment shown, the coating device 10 preferably has a blower 10E—which is in particular integrated into or arranged in the housing 10A—, particularly preferably in order to dry the lens 2 directly or immediately after coating and/or removal from the dipping bath. In this way, it is possible for the coating device 10 and thus the apparatus 1 to have a particularly compact design. Here, however, other approaches are also possible, in particular those in which the third cleaning device 6 and/or another drying device, not shown, is provided and/or used for drying the lens 2 that is coated with the coating agent B and/or is coated by means of the coating device 10.

Figure 6:
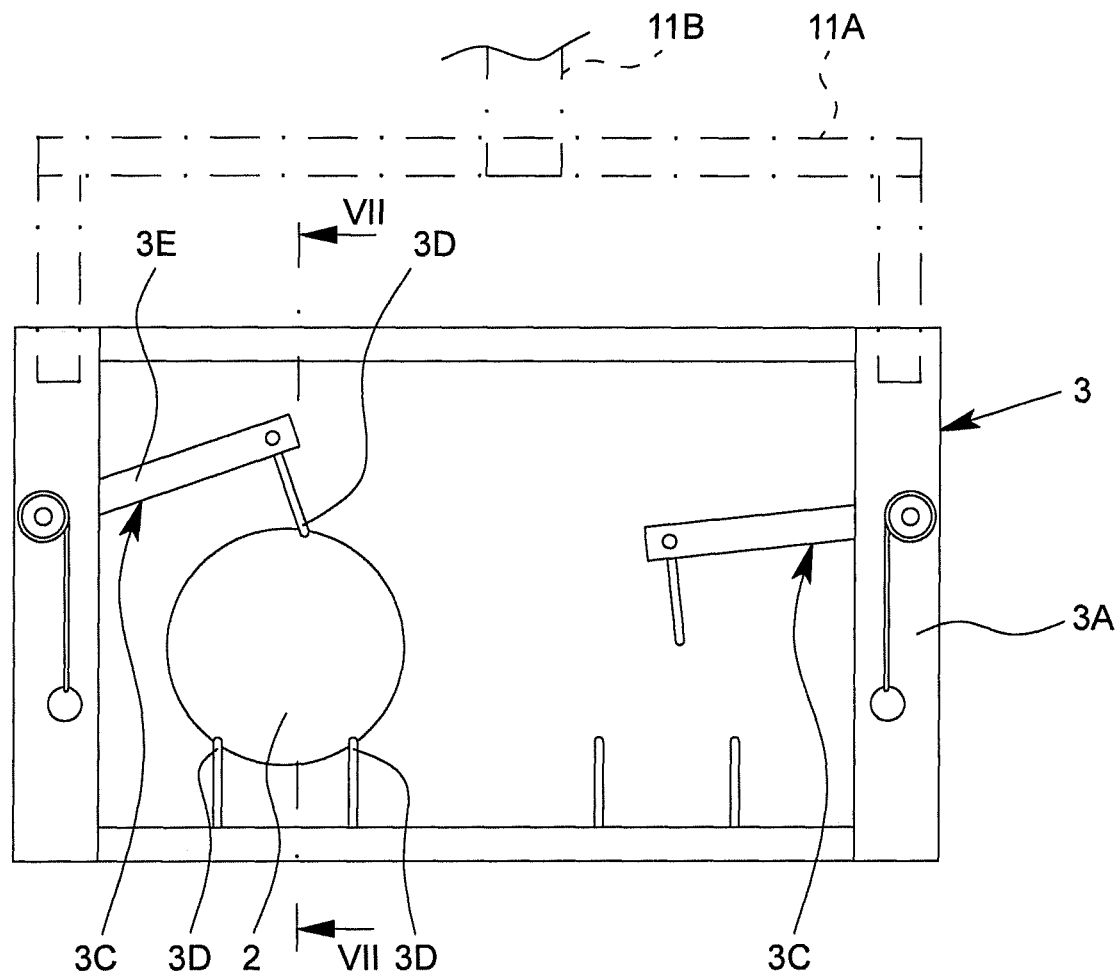
FIG. 6 is a schematic view of a carrier with a lens in accordance with a second embodiment.
Figure 7:
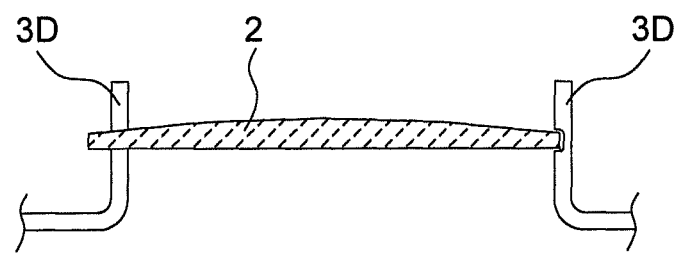
FIG. 7 is a schematic partial sectional view taken along line VII-VII in FIG. 6.

In a schematic view, FIG. 6 shows the carrier 3 according to an embodiment that is optimized for coating.

Figure 4:
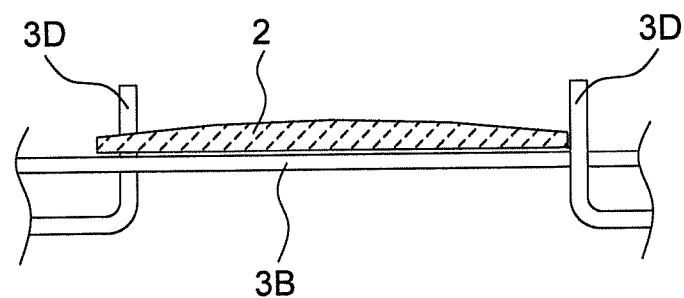
FIG. 4 is a schematic partial sectional view taken along line IV-IV in FIG. 3.

According to the embodiment shown, the carrier 3 is designed preferably to hold the lens 2 or several lenses 2, particularly preferably a pair of lenses 2 for a pair of eyeglasses, from the side and/or radially, in particular in such a way that the flat surfaces and/or the front and rear of the lens 2 are free and/or uncovered, and thus coating of the latter is not compromised by any components, such as the carrier rods 3B, as shown in FIGS. 3 and 4.

The carrier 3 is in particular designed to make flat-side coating of the lens 2 possible and/or to expose the lens 2 on its flat side completely or over the entire area for coating. Particularly preferably, this is accomplished by holding and/or clamping the lens 2 from the side and/or radially by means of the holding device 3C and/or the holding sections 3D, as already explained in connection with FIGS. 3 and 4.

In the embodiment depicted in FIG. 5, the apparatus 1 preferably has an additional and/or second handling device 11 for handling the lens 2 and/or the carrier 3 with the lens 2, in particular for feeding the lens 2 and/or the carrier 3 to the coating device 10.

Preferably, the first handling device 7 is provided for handling the lens 2 and/or the carrier 3 during and/or for cleaning, and the second handling device 11 is provided for handling the lens 2 and/or the carrier 3 during and/or for coating.

Particularly preferably, the lens 2 and/or the cleaned lens 2 and/or the carrier 3 with the cleaned lens 2 is picked up and/or gripped after cleaning by the second handling device 11 and is transferred in particular to the second handling device 11 in one of the cleaning devices 4, 5, and 6 and/or in the magazine 8, 9 in order to feed the lens 2 to the coating device 10 by means of the second handling device 11 and to coat it. In this way, as early as during the process of coating the lens 2, another lens 2 can be fed to the cleaning device 4, 5, or 6 by means of the first handling device 7 and/or can be cleaned in the cleaning device 4, 5, 6.

Preferably, the handling devices 7, 11 have a common rail 7D that extends in the X direction and/or in the arrangement direction of the cleaning devices 4, 5, 6 and the coating device 10 and/or holds and/or guides the gripping devices 7A, 11A and/or the arms 7B, 11B and/or the slides 7C, 11C, in such a way that they can be moved or shifted, in particular by a motor. Here, however, other solutions are also possible, in particular those in which the second handling device 11 has a separate slide (not shown).

Design approaches are, however, also possible in which a single and/or a common handling device 7 is provided for all cleaning devices 4, 5, 6 of the apparatus 1 and the coating device 10.

For receiving and/or holding, supplying, and/or intermediate storage of the coated lenses 2, a third and/or another magazine (not shown) is preferably provided. It is, however, also possible to store and/or temporarily store the coated lenses 2 in the first magazine 8 and/or the second magazine 9.

An apparatus 1 and a method for cleaning and optionally coating a lens 2 are proposed, wherein the lens 2 is or can be fed selectively by means of a common handling device 7 or several handling devices 7, 11 to several cleaning devices 4, 5, and 6 and an optional coating device 10.

Particularly preferably, in the method according to the invention, the lens 2 is initially cleaned in a common housing of an apparatus 1—preferably by mechanical means and/or by means of a brush 4C, 5C and/or by means of one or several cleaning devices 4, 5, 6—and is then coated—preferably in a coating device 10 and/or by means of a coating agent B—preferably wherein while the lens 2 is being coated, another lens 2 is fed to the cleaning device 4, 5, 6 and/or is cleaned in the cleaning device 4, 5, 6, respectively. In this case, preferably two separate handling devices 7, 11 are used, in particular wherein a first handling device 7 handles the lens 2 for cleaning and a second handling device 11 handles the lens 2 for coating.

Individual aspects and features of the present invention can also in principle be implemented independently of one another, but also in particular in any combination.

What is claimed is:

1. An apparatus for cleaning at least one lens, comprising:
a plurality of cleaning devices, each of which has a housing that is separate from the housings of the other cleaning devices and each of which is loadable and operable independently, and
a common handling device for feeding the at least one lens selectively to one of the cleaning devices,
wherein the handling device has a gripping device for gripping the at least one lens or a carrier with the at least one lens and holding the at least one lens suspended in a selected one of the cleaning devices,
wherein the cleaning devices each have a separate port for receiving the at least one lens or the carrier with the at least one lens, and wherein each of the ports has a slit-shaped or collar-shaped opening, and
wherein the opening of the respective port is closable or coverable with at least one of the common handling device and the gripping device when the at least one lens is held in the respective cleaning device by the common handling device.

2. An apparatus according to claim 1,
wherein the common handling device is adapted for feeding the at least one lens selectively to one of the cleaning devices suspended vertically based on a lens parameter enabling lens-specific cleaning of the particular at least one lens, and
wherein the handling device is adapted for varying, depending on the lens parameter, positioning of the at least one lens within the selected cleaning device by moving the at least one lens in a direction transversely to a vertical direction.

3. The apparatus according to claim 2, wherein the lens parameter is the lens size or the lens thickness.

4. An apparatus according to claim 1,
wherein the common handling device is adapted for feeding the at least one lens to the cleaning devices suspended vertically based on a lens parameter enabling lens-specific cleaning of the particular at least one lens,
wherein the common handling device is movable for feeding the at least one lens selectively into one of the cleaning devices and for holding and moving the at least one lens suspended vertically during cleaning in the selected cleaning device, and
wherein the handling device is adapted for varying the movement of the at least one lens during cleaning by varying at least one of the speed, movement frequency and oscillation frequency depending on the lens parameter.

5. The apparatus according to claim 4, wherein the handling device is adapted for producing a gyrating motion of the at least one lens during cleaning.

6. The apparatus according to claim 4, wherein the handling device is adapted for moving the at least one lens in a direction transversely to a feeding direction during cleaning.

7. The apparatus according to claim 4, wherein the handling device is adapted for moving the at least one lens or the carrier with the at least one lens along three axes during cleaning.

8. The apparatus according to claim 1, wherein the cleaning devices are modular units for enabling the apparatus to be converted to meet different cleaning requirements.

9. The apparatus according to claim 1, wherein the apparatus has a common housing that encompasses the cleaning devices and the common handling device.

10. The apparatus according to claim 1, wherein the cleaning devices are arranged next to one another in one direction and the handling device is adapted for feeding the at least one lens or the carrier with the at least one lens transversely relative to said one direction.

11. The apparatus according to claim 1, wherein the handling device has at least one of an arm that is movable in a vertical direction and a slide that is movable in a horizontal direction along a rail to move the at least one lens or the carrier with the at least one lens in a corresponding direction.

12. The apparatus according to claim 1, wherein the handling device is adapted for moving the at least one lens or the carrier with the at least one lens along three axes.

13. The apparatus according to claim 1, wherein the cleaning devices each have a closure element for closing an opening of a port of the cleaning device.

14. The apparatus according to claim 1, wherein the handling device is adapted to move the at least one lens back and forth in a single vertical plane or linearly to move the at least one lens into and out of the respective cleaning device.

15. The apparatus of claim 1, wherein at least one of the cleaning devices is a cleaning unit with at least one brush.

16. The apparatus of claim 1, wherein at least one of the cleaning devices is a drying unit with at least one blower.

17. The apparatus of claim 1, further comprising at least one coating device for coating the at least one lens, the at least one coating device being loadable and operable independently of the cleaning devices,
wherein the at least one coating device is separate from the cleaning devices and is located in a common housing following the cleaning devices.

18. The apparatus according to claim 17, wherein the common handling device is adapted for feeding the at least one lens selectively to one of the cleaning devices and to the coating device.

19. The apparatus according to claim 17, further comprising another handling device for feeding another lens selectively to the coating device,
wherein the other handling device has a gripping device for gripping the other lens or a carrier with the other lens and holding the other lens suspended in the coating device, and
wherein the common handling device is adapted for feeding the at least one lens selectively to one of the cleaning devices when the other lens is coated in the coating device.

20. The apparatus according to claim 17, wherein the coating device comprises a processing chamber filled with a coating agent.

21. The apparatus according to claim 17, wherein the coating device has a blower for drying the lens after coating.

22. An apparatus for cleaning at least one lens, comprising:
several cleaning devices and
a common handling device for feeding the at least one lens to the cleaning devices,
wherein the common handling device has means for feeding the at least one lens selectively to one of the cleaning devices,
wherein the cleaning devices are loadable or operable independently of one another,
wherein the handling device has a carrier for holding two lenses and a gripping device for gripping the carrier with the two lenses and holding it in the respective cleaning device,
wherein the carrier has a closed frame enclosing a vertical lens supporting surface on which the lenses lie next to each other in the same plane and holding sections which are engageable with the periphery or edge of the lenses,
wherein, for each lens, at least one of the holding sections is a fixed, unmovable holding section and at least one other holding section is a movable holding section,
wherein each movable holding section is pre-stressed by the force of a spring,
wherein each spring is located at the closed frame, and
wherein the movable holding section is engageable with the respective lens in a pre-stressed manner to press the respective lens against the fixed, unmovable holding section in order to clamp the respective lens between the fixed, non-movable holding section and the movable holding section.

23. The apparatus according to claim 22, wherein the holding sections extend transversely with respect to the vertical lens supporting surface.

* * * * *